US008690658B2

(12) United States Patent
Pacey et al.

(10) Patent No.: US 8,690,658 B2
(45) Date of Patent: *Apr. 8, 2014

(54) WAGERING GAME SYSTEM WITH COMMUNITY GAMING SYSTEM

(75) Inventors: Larry J. Pacey, Chicago, IL (US); Joel R. Jaffe, Glenview, IL (US); Shridhar P. Joshi, Naperville, IL (US); Allon G. Englman, Chicago, IL (US); Peter R. Anderson, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/296,890

(22) Filed: Nov. 15, 2011

(65) Prior Publication Data

US 2012/0071226 A1 Mar. 22, 2012

Related U.S. Application Data

(63) Continuation of application No. 11/991,564, filed as application No. PCT/US2006/035094 on Sep. 8, 2006, now Pat. No. 8,057,294.

(60) Provisional application No. 60/715,991, filed on Sep. 9, 2005.

(51) Int. Cl.
*A63F 9/24* (2006.01)
*A63F 13/00* (2006.01)

(52) U.S. Cl.
USPC .................. 463/20; 463/16; 463/21; 463/25; 463/42

(58) Field of Classification Search
USPC ................ 463/16, 20, 21, 25, 42; 273/138.1, 273/138.2, 143 R
See application file for complete search history.

(56) References Cited

U.S. PATENT DOCUMENTS 5,766,076 A 6/1998 Pease et al. .................... 463/27
5,842,921 A 12/1998 Mindes et al. ................. 463/16
(Continued)

FOREIGN PATENT DOCUMENTS

EP 1184822 6/2002 ............. G07F 17/32
JP 2002-325889 11/2002 ................ A63F 5/04

OTHER PUBLICATIONS

Third Party Submission in Published Application under 37 C.F.R. § 1.99 dated May 21, 2012 filed in U.S. Appl. No. 13/296,890 (2 pages).

(Continued)

*Primary Examiner* — William Brewster
*Assistant Examiner* — Ryan Hsu
(74) *Attorney, Agent, or Firm* — Nixon Peabody LLP

(57) ABSTRACT

A method of conducting a wagering game on a gaming system, the method including receiving an indication of a wager and displaying outcomes of wagering games on at least one display device in response to a wager indication being received, the displayed outcomes being randomly generated by at least one processor. The method also including accumulating a bonus-event playing time upon satisfying at least one predetermined condition as the wagering games are played, initiating a bonus game in which a player is eligible to receive awards for a period of time, determining, via at least one processor, the accumulated playing time accrued prior to the initiation of the bonus game, allowing the player to participate in the bonus game for at least as long as the accumulated playing time and providing any awards earned by the player during their participation in the bonus game.

20 Claims, 6 Drawing Sheets

(56) References Cited

U.S. PATENT DOCUMENTS

| | | | | |
|---|---|---|---|---|
| 6,656,048 | B2 | 12/2003 | Olsen | 463/25 |
| 7,740,534 | B2 * | 6/2010 | Walker et al. | 463/16 |
| 2003/0224852 | A1 * | 12/2003 | Walker et al. | 463/20 |
| 2004/0162130 | A1 * | 8/2004 | Walker et al. | 463/16 |
| 2007/0060297 | A1 * | 3/2007 | Hein et al. | 463/20 |
| 2009/0042641 | A1 * | 2/2009 | Anderson et al. | 463/25 |

OTHER PUBLICATIONS

International Search Report, (2 pages) dated Mar. 26, 2007.

* cited by examiner

WAGERING GAME SYSTEM WITH COMMUNITY GAMING SYSTEM

CROSS-REFERENCE TO RELATED APPLICATIONS

This application is Continuation of U.S. patent application Ser. No. 11/991,564, now U.S. Pat. No. 8,057,294 B2, which is a U.S. national phase of and claims priority to, International Patent Application Serial No. PCT/US2006/035094, which was filed on Sep. 8, 2006, which claims the benefit of priority of U.S. Provisional Patent Application Ser. No. 60/715,991, filed Sep. 9, 2005, all of which are incorporated by reference herein in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having a gaming machine for determining a community-event outcome and methods for determining eligibility for and triggering of such community-event.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a “secondary” or “bonus” game that may be played in conjunction with a “basic” game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with “progressive jackpot” awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming machines with new types of bonus games to satisfy the demands of players and operators.

To provide randomly generated numbers related to the bonus game, some current bonus games use a random number generator that is included in a server of the bonus game. One problem associated with this type of server is that the server is categorized as a gaming machine and, therefore, it is required to meet numerous gaming regulations typically associated with a gaming machine. For example, this type of server is generally required to pass criteria related to randomness, fairness, and/or tampering. Thus, a need exists for a wagering game system with a bonus game, or community-event, having a shared outcome that is determined by a gaming machine. In at least some aspects, the present invention is directed to satisfying this need. In at least some other aspects, the present invention addresses the conditions for determining eligibility of and for triggering of such community-event.

SUMMARY OF THE INVENTION

According to one aspect of the present invention, a method of conducting a wagering game on a gaming system is provided including an input device, and at least one display device, operably connected to one or more processors, the method including receiving an indication of a wager and displaying outcomes of wagering games on the at least one display device in response to a wager indication being received, the displayed outcomes being randomly generated by at least one of the one or more processors. The method also including accumulating a bonus-event playing time upon satisfying at least one predetermined condition as the wagering games are played, initiating a bonus game in which a player is eligible to receive awards for a period of time, determining, via at least one of the one or more processors, the accumulated playing time accrued prior to the initiation of the bonus game, allowing the player to participate in the bonus game for at least as long as the accumulated playing time and providing any awards earned by the player during their participation in the bonus game.

According to another aspect of the invention, a gaming system for conducting a wagering game including a bonus game, the gaming system comprising at least one input device, at least one display device, at least one processor and at least one memory device that stores a plurality of instructions that, when executed by the at least one processor, cause the at least one processor to operate with the at least one display device and the at least one input device to receive an indication of a wager, display a randomly generated outcome of the wagering game in response to the wager indication being received, accumulate bonus-event playing time upon satisfying at least one predetermined condition as the wagering games are played, initiate a bonus game in which a player is eligible to receive awards for a period of time, determine the accumulated playing time accrued prior to the initiation of the bonus game, provide the bonus game for at least as long as the accumulated playing time and credit any awards earned by the player during their participation in the bonus game.

According to yet another aspect of the invention, a computer program product comprising a non-transient computer-readable medium having an instruction set borne thereby, the instruction set being configured to cause, upon execution by one or more controllers, the acts of receiving an indication of a wager, determining outcomes for wagering games in response to a wager indication being received, the outcomes being randomly determined from a plurality of outcomes, accumulating a bonus-event playing time upon satisfying at least one predetermined condition as the wagering games are played, initiating a bonus game in which a player is eligible to receive awards for a period of time, determining the accumulated playing time accrued prior to the initiation of the bonus game and executing the bonus game for at least as long of a duration as the accumulated playing time.

Additional aspects of the invention will be apparent to those of ordinary skill in the art in view of the detailed description of various embodiments, which is made with reference to the drawings, a brief description of which is provided below.

DETAILED DESCRIPTION

Figure 1:
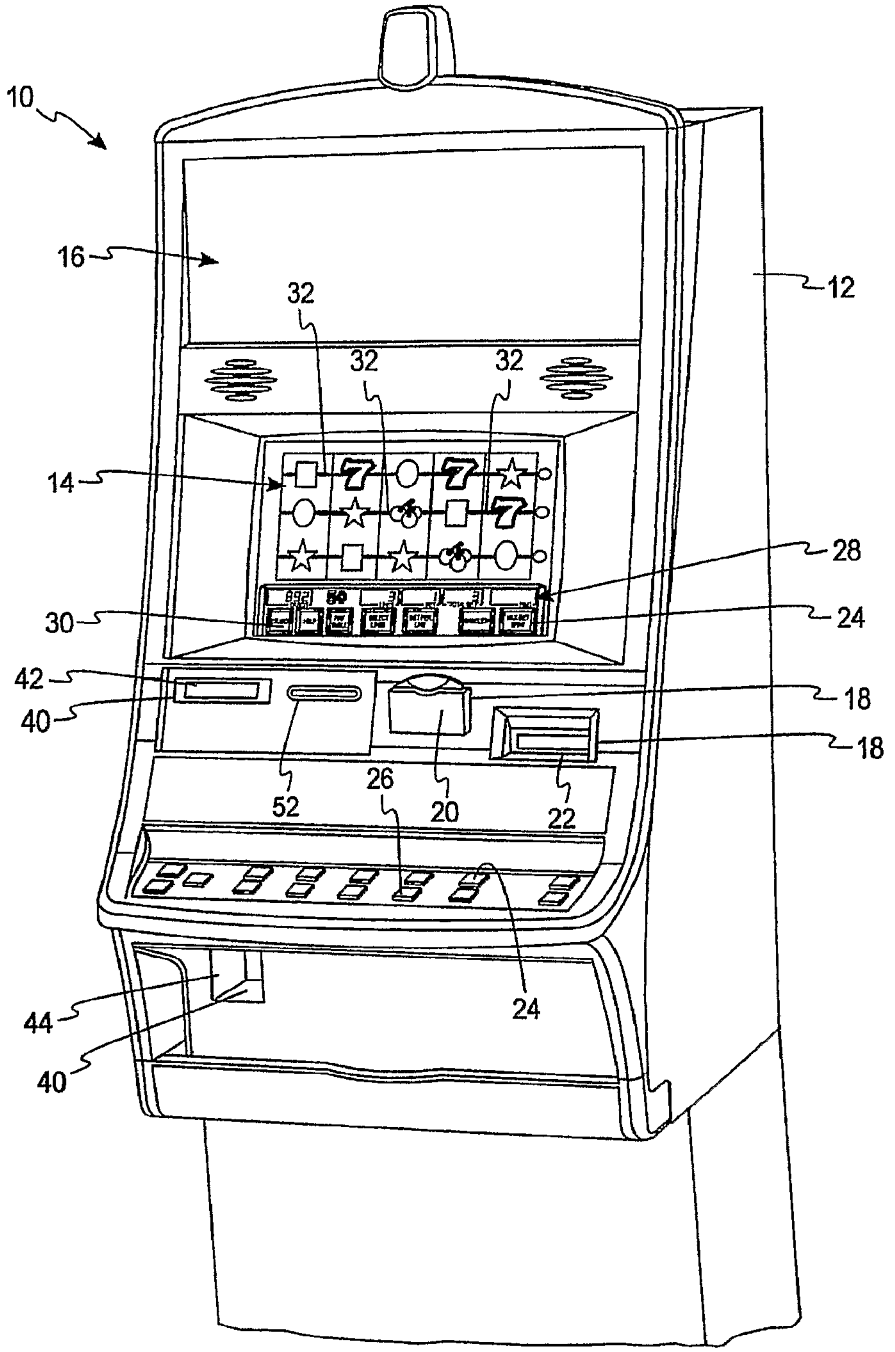
FIG. 1 is a perspective view of a gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, or it may be an electronic gaming machine configured to play a video casino game, such as blackjack, slots, keno, poker, blackjack, roulette, etc.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of the operating the game, while the touch keys 30 may allow for input needed for another aspect of the game.

The various components of the gaming machine 10 may be connected directly to, or contained within, the housing 12, as seen in FIG. 1, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 may take the form of a cathode ray tube (CRT), a high resolution LCD, a plasma display, an LED, or any other type of display suitable for use in the gaming machine 10. As shown, the primary display 14 includes the touch screen 28 overlaying the entire monitor (or a portion thereof) to allow players to make game-related selections. Alternatively, the primary display 14 of the gaming machine 10 may include a number of mechanical reels to display the outcome in visual association to at least one payline 32. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1 as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 2:
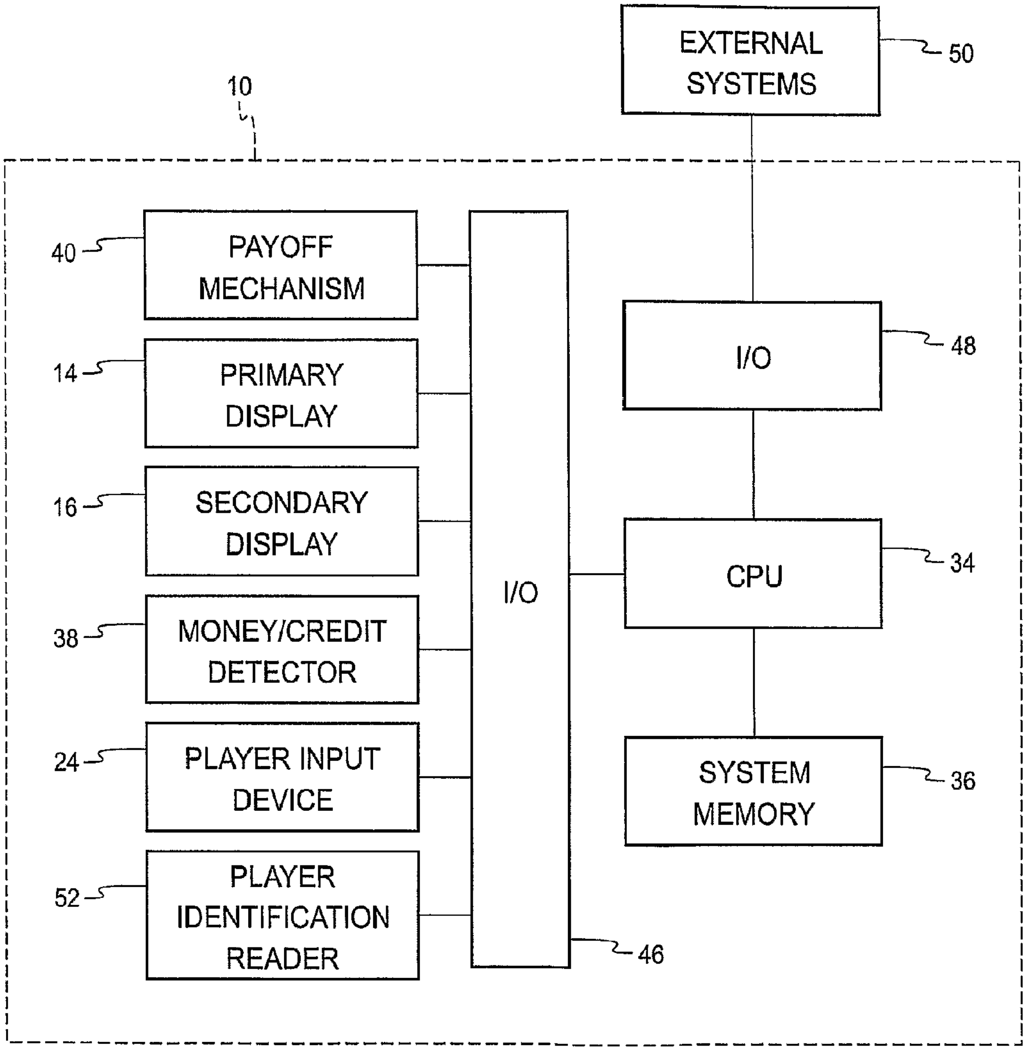
FIG. 2 is a block diagram of a control system suitable for operating the gaming machine.

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10 bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36.

Figure 3:
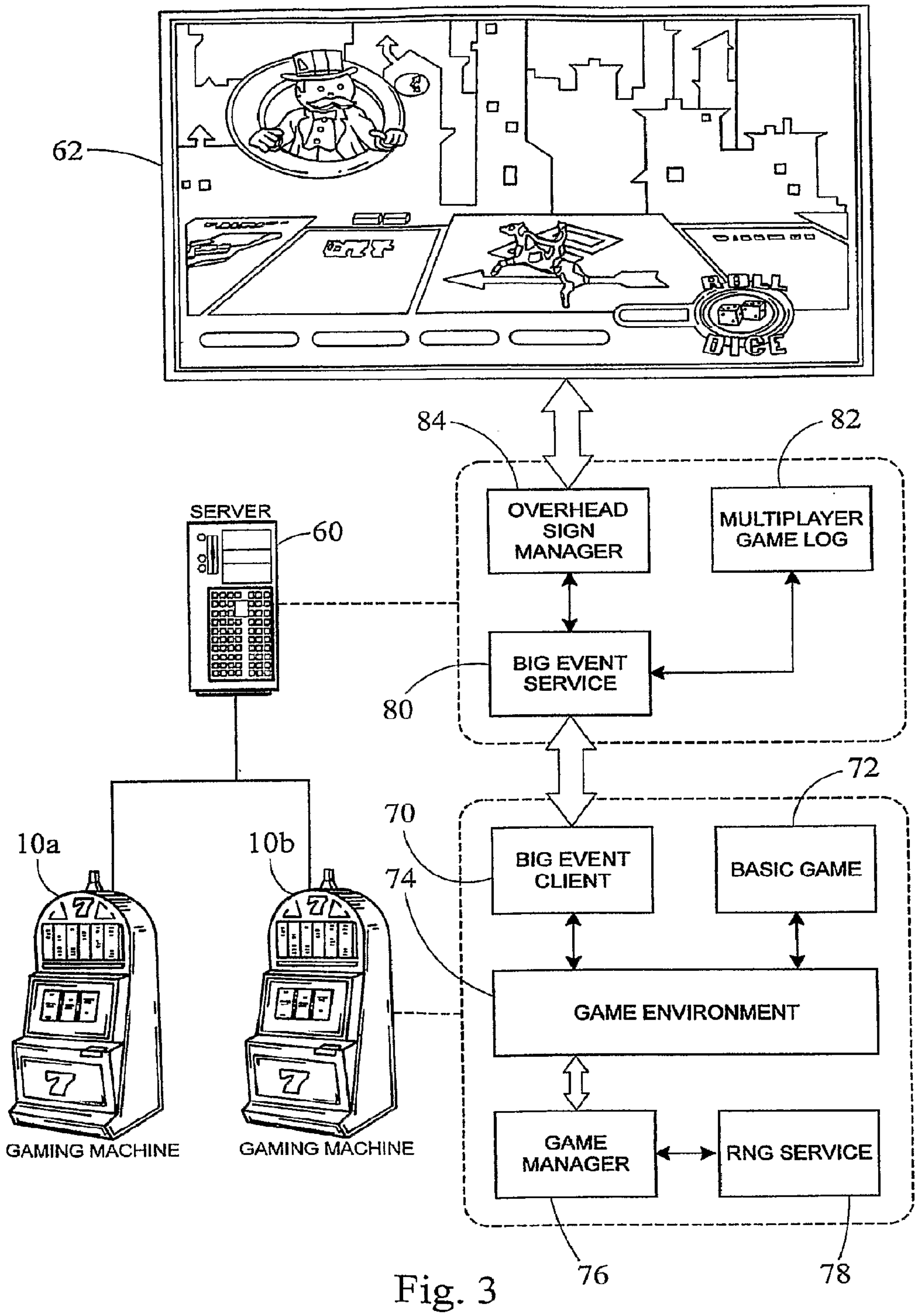
FIG. 3 is a representation of a gaming system for conducting a community-event, according to one embodiment of the present invention.

Turning now to FIG. 3, a gaming system includes a plurality of gaming machines 10*a*, 10*b*, a server 60, and an optional overhead sign 62 that is viewable by players at gaming machines 10*a*, 10*b*. The gaming system is used for conducting a community-event, which in this case is the "Monopoly® Big Event" game (hereinafter "Big Event Game"), in which a plurality of gaming machines 10*a*, 10*b* share community-event outcomes.

The term community-event game, as used herein, relates to any game in which a competitive element, collaborative element, and/or shared experience/outcome is present. In one example, the community-event game may comprise a game in which one player participates in the game and a plurality of players share in the award, in at least some respect. In another example, the community-event game may also comprise a game in which a plurality of players play the game, but only one player wins an award. In yet another example, the community-event game may even include a game in which one player plays the game for the benefit of another player or players and does not himself or herself share in the award. Neither these examples of various aspects of community-event games, nor other examples provided herein, are to be construed as limiting the overall concept, defined above.

The community-event thus encompasses simultaneous play by a plurality of participating players as well as sequential or turn-based play by a participating players. The community-event does not require parity between players and the level of participation or promise of an award does not have to be equal for all participants. In at least some embodiments, for example, players may have different roles in the community-event game or players may have different award potentials based on satisfaction of different eligibility requirements. In at least some other embodiments, gaming machines are linked together so that players may participate in a game with other players wherein at least two players participate and/or wherein at least two players benefit from an outcome of the community-event game.

The Big Event Game is initiated by an event within one of the gaming machines 10*a*, 10*b*. For example, the Big Event Game can be triggered when a player achieves a particular set of symbols on the basic game. In another example, the Big Event Game can be triggered at random intervals. For example, the Big Event Game can be triggered if a selected random number is within a predetermined range. The gaming machine that initiates the Big Event Game is also referred to as the "initiator" machine.

When the Big Event Game has been triggered, other ones of the gaming machines 10*a*, 10*b* may be notified and invited to participate. If an eligible player accepts the invitation, then the Big Event Game is initiated on his or her gaming machine and it is displayed for allowing the player to observe outcomes of the Big Event Game.

At least one of the gaming machines 10*a*, 10*b* includes a Big Event Client 70, a basic game 72, a game environment 74, a game manager 76, and an RNG Service 78. The Big Event Client 70 is, for example, an additional software component that is added to the system memory 36 and that is controlled by the controller 34 (FIG. 2).

The server 60 includes a Big Event Service 80 (referred to hereinafter as a Big Event Coordinator 80), a multiplayer game log 82, and an optional overhead sign manager 84. The Big Event Coordinator 80 resides, and executes, on the server 60, which can also be, optionally, an overhead sign controller, a carousel controller, or a dedicated platform. In alternate embodiments, the Big Event Coordinator 80 may reside and execute on one of the gaming machines 10*a*, 10*b*.

In operation, when the Big Event Game is triggered, the RNG Service 78 within a designated or selected gaming machine, such as gaming machine 10*b*, dictates one or more of the outcomes in the Big Event Game. As such, the Big Event Coordinator 80 in the server 60 requests random outcomes, e.g., random numbers, from the RNG Service 78 when the Big Event Game is being played. After receiving one or more of the random outcomes from the Big Event Client 70, the Big Event Coordinator 80 distributes the received random outcomes to all participating machines of the gaming machines 10*a*, 10*b*. In other words, the Big Event Coordinator 80 provides a shared determination to participating ones of the gaming machines 10*a*, 10*b* but does not determine the random outcomes.

The community-event game (e.g., the Big Event Game) is conducted on eligible ones of the gaming machines 10*a-f*. The eligibility determination may be based on various criterion, criteria and/or models, non-limiting examples of which are noted below.

The eligibility may be gaming machine specific, requiring each gaming machine to independently qualify for participation in the community-event game by satisfying the eligibility criteria. In another aspect, the eligibility may be satisfied by a single gaming machine from a group of gaming machines. In still other aspects, the eligibility model may comprise a plurality of separate eligibility requirements, which may be satisfied by any single gaming machine from a group of gaming machines, or which may be collectively satisfied by any number of gaming machines from a group of gaming machines. Thus, the collection or satisfaction of eligibility conditions may be carried on as a group or shared activity, rather than as an individual activity. Still further, for large groups of gaming machines, sub-groups may engage in competitions between themselves to be the first to satisfy the eligibility criteria and enter the community game. In such competitions, the losing sub-groups may have to restart from the beginning following initiation of a new community-event game cycle, or may alternatively be permitted to retain one or more of the eligibility criteria which had been satisfied.

In at least some embodiments, eligibility for a community-event game, such as the Big Event Game, may be contingent upon the satisfaction of a single predetermined condition. In this single predetermined condition model, a controller (e.g., 34) polls all of the linked gaming machines 10*a-f*, or receives equivalent polling information transmitted from each of the linked gaming machines, to monitor such predetermined condition. The predetermined condition may be, for example, the last bet placed by the player, an aggregate amount of coin-in by the player, a minimum rate of coin-in by a player, an aggregate rate of coin-in by a player, or a particular configuration of bet (e.g., a bet covering all pay lines or a maximum bet for one pay line or a plurality of pay lines), just prior to a point in time at which the gaming machine is polled. If, upon polling, the controller 34 determines that a particular gaming machine has satisfied the predetermined condition, that gaming machine is deemed eligible to participate in the Big Event Game. Thus, in accord with at least some aspects, entry into the Big Event Game may be regulated purely by a single factor within the control of every player at a gaming machine configured to play the Big Event Game.

In accord with at least some other aspects of the single predetermined condition model, entry into the Big Event Game may be regulated by a random factor, such as a predetermined condition comprising or consisting of a particular symbol or combinations of symbols occurring during the basic wagering game or during an associated bonus game. In various examples, players could become eligible for entry into the Big Event Game by attaining at least one winning combination of symbols on two reels, three reels, or four reels (i.e., any two, three, or four reel winning combination) or by attaining specific winning combination of symbols on two reels, three reels, or four reels. Eligibility for entry into the Big Event in accord with the single predetermined condition model may also be predicated upon the occurrence of a particular symbol during play of a basic wagering game. For example, one or more reels on each gaming machine may comprise a specific symbol that automatically confers eligibility for the Big Event Game if the specific symbol falls along an active pay line. The frequency at which this specific symbol occurs may be set, or varied, to condition participation in a Big Event Game and approximate a certain level and/or rate of eligibility for the Big Event Game. These same concepts apply to the occurrence of a class of outcome or a specific outcome in a bonus game, or like game. Thus, a player may obtain a guaranteed entry into a community-event as a result of a particular bonus result or outcome.

In at least some other aspects, eligibility for a community-event game may be contingent upon the satisfaction of a predetermined condition within a specific window or time frame. In this framing eligibility model, a controller (e.g., 34) polls all of the linked gaming machines 10*a-f*, or receives equivalent polling information transmitted from each of the linked gaming machines, to monitor the predetermined condition during the requisite time frame. The time frame could be any selected time frame including very small time frames (e.g., microseconds, milliseconds, seconds, etc.) or larger time frames (e.g., 1 hours, 2 hours, 4 hours).

The predetermined condition occurring during the aforementioned time frame may be, for example, the last bet placed by the player, the sum total or aggregate of coin-in, the average rate of coin-in, a minimum rate of coin-in by a player, a maximum bet placed by the player, or a particular configuration of bet by a player (e.g., a bet covering all pay lines or a maximum bet for one pay line or a plurality of pay lines). In accord with at least some other aspects of the framing eligibility model, entry into the Big Event Game may be regulated by a random factor, such as a predetermined condition comprising or consisting of a particular symbol or combinations of symbols (e.g., winning outcome) occurring during the basic wagering game or during a bonus game. For example, players could become eligible for entry into the Big Event Game by the occurrence of a winning combination of symbols on two, three or four reels (i.e., any two, three, or four reel winning combination) along an active pay line, by occurrence of a specific winning combination of symbols on two reels, three reels, or four reels along an active pay line, or the occurrence of a particular symbol along an active pay line during play of a basic wagering game. As noted above, these same concepts apply to the occurrence of a class of outcome or specific outcome in a bonus game, or like game. Thus, a player may obtain a guaranteed entry into a community-event as a result of a particular bonus result or outcome achieved within the requisite time frame.

In yet other embodiments, the eligibility for a community-event game may be contingent upon the satisfaction of a plurality of conditions or gates prior to the triggering of the community-event. In this multiple-condition eligibility model, once a predetermined number of separate conditions have been satisfied, the gaming machine is enabled to participate in the subsequent community-event. In one aspect, the conditions may be satisfied in any order. In another aspect, the conditions must be satisfied in a predetermined order, each condition functioning as a gate to a succeeding condition. In this latter aspect, a first condition must be satisfied before a second condition may be satisfied, and a second condition must be satisfied before a third condition may be satisfied, and so on, until a condition is satisfied which enables entry into the community-event game. The satisfaction of each condition may itself be a trigger to enable the subsequent condition. Accordingly, the order in which the conditions are satisfied may be, or may not be, important or relevant.

In various examples of the multiple-condition eligibility model, the individual conditions might include, but are not limited to, whether or not player places a maximum bet, whether player attains a minimum average of coin-in over a specified period of time, whether the player attains an aggregate total of coin-in, whether the player places a certain configuration of bet (e.g., covering all pay lines), whether a player achieves a particular result or symbol in a basic wagering game or bonus game, or whether a player achieves one or more particular winning combinations. In accord with at least some other aspects of the multiple-condition eligibility model, entry into the Big Event Game may be regulated in part by a predetermined condition comprising or consisting of a particular symbol or combinations of symbols (e.g., winning outcome) occurring along a pay line during the basic wagering game. A winning combination of symbols might comprise, for example, any two, three or four reels winning combination or any specific winning combination of symbols on two reels, three reels, or four reels along an active pay line. As noted above, these concepts extend to the occurrence of various random classes of outcomes or specific outcomes in a bonus game, or like game. Thus, a player may become eligible for entry into a community-event, at least in part, as a result of a particular combination of bonus results or bonus outcomes. The eligibility for entry into a community-event may, for example, be conditioned upon satisfaction of a set of first set of conditions in a basic wagering game in combination with a second set of conditions in a bonus game. For example eligibility may require a 2-reel winning outcome and a 3-reel winning outcome in a basic wagering game and a first and a second winning outcomes in a bonus game.

In at least some embodiments of the multiple-condition eligibility model, players might be awarded tokens redeemable for play of a Big Event Game or might be awarded a fixed amount of playing time in a Big Event Game. This award may be in lieu of or in addition to a predetermined payout for each occurrence of a winning combination of symbols on two, three or four reels (i.e., any two, three, or four reel winning combination) along an active pay line. Similar to conventional pay out schemes, the value of awarded tokens or Big Event Game playing time, may be a small value for only a two reel winning combination, a medium value for a three reel combination, and a large value for a four reel combination. Moreover, certain two, three, or four reel combinations may be worth more than other two, three, or four reel combinations. Thus, as a player continues to play a basic wagering game, the player may accumulate tokens which may be redeemed for entry into a Big Event Game once a player has accumulated a minimum number of such tokens. Alternatively, as a player plays a basic wagering game, the player may accumulate playing time in a Big Event Game. The controller 34 may require a certain minimum quantity of playing time for a player or gaming machine to be eligible to participate in the Big Event Game. In another aspect, the player may be free to enter the Big Event Game without restriction, even though the player's time might be limited. In this aspect, the player may be empowered to independently strategize and assume responsibility for potentially squandering insufficient Big Event Game play time. The above-noted concepts apply equally to any single reel outcome wherein a particular symbol (e.g., a "Big Event Game" Symbol) occurs along a pay line during the basic wagering game.

As with the preceding examples, in the multiple-condition eligibility model, a controller (e.g., 34) polls all of the linked gaming machines 10*a-f*, or receives equivalent polling information transmitted from each of the linked gaming machines, to monitor the satisfaction of each of the requisite conditions, or an aggregation thereof, for specific gaming machines.

In still another aspect of the present concepts, eligibility for a community-event game, such as the Big Event Game, may be contingent upon the satisfaction of a mystery trigger event. In this aspect, a controller (e.g., 34) polls all of the linked gaming machines 10*a-f*, or receives equivalent polling information transmitted from each of the linked gaming machines, to monitor factors such as the inputs, results, outcomes and/or bets placed on each of the gaming machines. The mystery trigger event could include, for example, any of the aforementioned single or multiple predetermined conditions, which may or may not be time or sequence sensitive. In at least some aspects, the mystery trigger could randomly vary, such that each initiation of a Big Event Game is based on different ones of the above criteria. Thus, in at least some embodiments, a controller 34 may randomly select an eligibility model or factor from a range of acceptable factors so as to vary game play and so as to render any gaming machine's eligibility for any particular community-event a mystery. In such embodiments, a player might not know if eligibility will conditioned upon, for example, the player's inputs, results and/or bets entered in the next play, next 10 minutes of play, or next hour of play.

In yet another aspect of the present concepts, eligibility for a community-event game, such as outlined above and herein, may be saved for later use by the player. In this aspect, a player who has achieved a certain condition or conditions which would otherwise provide eligibility for a subsequent community-event, or a player who has accumulated an eligibility for a community-event, may electronically store such status either locally on the gaming machine (e.g., using the information reader/writer 52), on a system memory 36, or transmitted to a remote storage device through a network, telecommunication pathway, or carrier signal. Alternatively, the player's status may be written to or encoded on a portable card (e.g., magnetic card, optical card) or encrypted and/or printed on a substrate resistant to counterfeiting (e.g., a security ink on a security paper). The player's status may be optionally associated with a player identification number and/or other identifying information. This aspect of the present concepts permits a player with the flexibility to enter and depart a wagering game associated with a Big Event Game at will, thereby increasing the overall appeal of the wagering game and community-event.

In still another aspect of the present concepts, a player may simply purchase outright eligibility for entry into a community-event. Although the purchase price may be fixed, it is more likely that the purchase price would be tied to one or more factors or rates. For example, in one embodiment, the estimated purchase price for eligibility for entry into a community-event may be based upon at least one of, if not both of, an award that is to be awarded in the community-event game (e.g., a known or predicted progressive amount) and a probability of any one participant winning such award or sharing in such award. Thus, a purchase price of eligibility for entry into a community-event would be correspondingly less for a low probability of winning an award and correspondingly higher for either higher probabilities of an award and/or higher award potentials.

In a related embodiment, a player may purchase a component for eligibility for entry into a community-event. In this example, a player may have been diligently playing a wagering game in the hope of participating in a community-event game. However, the player may have failed to satisfy the particular eligibility model when the controller 34 initiates its polling to determine eligibility for the community-event game. In accord with this eligibility-purchase feature, the controller may inform ineligible gaming machines (i.e., players) that they failed to satisfy a certain condition for eligibility for the community-event and they may be offered the option of purchasing the component in which they were lacking.

For example, for a player playing on a gaming system having, at least at that time, a multiple-condition eligibility model, may have achieved a 1$^{st}$ and a 2$^{nd}$ of 3 required 3-reel outcomes and may have achieved a special event symbol outcome, but may have failed to obtain the 3$^{rd}$ of the of 3 required 3-reel outcomes. The controller may then notify the player that the player has a limited period of time (e.g., a countdown timer having 10 or 30 seconds) to make a decision about purchasing the 3$^{rd}$ of the of 3 required 3-reel outcomes for a calculated amount (e.g., 125 credits). As noted above, the assignment of a value to the missing component(s) is most logically based upon a weighing of the probability of that such player would achieve or share in a particular award during the community-event game, although the actual mathematics behind such determination may be significantly varied.

In still another related embodiment, the aforementioned feature permitting purchase of a component for eligibility for entry into a community-event may only be enabled on a turn specific basis or in a time-block basis, by the purchase of insurance enabling such feature. The enabling of this feature may thus be set by having an active minimum side bet (e.g., 1 credit, 5 credits) at the time that the controller 34 initiates its polling to determine eligibility for the community-event game. Thus, to ensure that such feature is active, a player would ordinary be required to place the minimum side bet during each play of the basic wagering game. In another example, the player may be permitted to purchase a time-block supplemental eligibility which causes the controller 34 to, during the time-block, inform the player that they failed to satisfy a certain condition for eligibility for the community-event and to offer the player the option to purchase a supplemental condition for eligibility to permit the player to participate in the community-event game. The player may thus avoid the need to input a separate side wager for each play of the basic wagering game in favor of a global side bet that remains in force for a specified time period (e.g., 5 minutes, 10 minutes, 15 minutes, 30 minutes, 1 hour, etc.).

In at least some other embodiments, a player may be permitted to place a side bet or to purchase a time-block (e.g., 10 minutes of side bets) or a block of side bets (e.g., a side bet for 10 plays of the basic wagering game) to permit automatic entry into a community-event should the controller 34 initiate its polling to determine eligibility for the community-event game. Unlike some of the previously-noted embodiments, this option would not require the player to separately purchase any specific community game preconditions for eligibility in which the player may be lacking for any specific eligibility model.

In other embodiments, eligibility for a community-event game, such as the Big Event Game, could be time specific. In this time-specific model, a controller (e.g., 34) polls all of the linked gaming machines 10*a-f*, or receives equivalent polling information transmitted from each of them on a schedule. In one aspect, the polling would occur every ten minutes, so that at any given hour where the hour is represented by x, a community-event game would be triggered at x:00, x:10, x:20, x:30, x:40, and x:50. The community-event presented at each of these times could be the same community-event game or different community-event games. Moreover, although in some aspects an eligibility determined by a polling at x:10 would render a player eligible to play a community-event game occurring at x:10, the community-event games for which eligibility is based and the determination of eligibility need not be contemporaneous. For example, there could be a temporal offset wherein a player obtaining eligibility at x:10 might not be eligible to redeem that eligibility until x:30. In yet another example of this time-specific model, a community-event game would be triggered every hour at the half-hour (i.e., at x:00, x:30), wherein a first Big Event Game is played on the hour (i.e., at x:00) and a second Big Event Game is played on the half-hour (i.e., x:30). In this example, if a player qualifies for the second Big Event Game at the time x:40 (e.g., 12:40), he or she will have to wait until the time (x+1):30 (e.g., 1:40).

To provide additional flexibility to the above aspects of the time-specific model, players may be given various options. In one option, the player might me given the option to play the community-event game on their gaming machine right away as a standard bonus game. In this option, they could play the game right away, but with a reduced possible award set. Thus, certain aspects of the community-event game, such as a progressive award, might be withheld. Moreover, a player electing this option would forgo any potential benefits which might otherwise potentially accrue in the community-event game setting by virtue of other player's participation in the community-event game and any sharing of awards which might arise therefrom. Alternatively, in accord other embodiments disclosed herein, such player may also be permitted to electronically store such status in a storage device (e.g., 36), on a portable card (e.g., magnetic card), or on a printed substrate (e.g., voucher). Consistent with still other embodiments, the player may be permitted to enter into a different community-event game upon payment of a fee tied to differences in awards, outcomes and probabilities for the different games. In some cases, a player may move from a higher value community-event game to a lower value community-event game and would not have to pay additional fees. In still other cases, a credit may be provided to a player moving from a higher value community-event game to a lower value community-event game.

In another example of this time-specific model, clock-based eligibility could happen randomly within any block of time every hour. Thus, using the above example, instead of polling occurring every ten minutes, a community-event game would be triggered randomly within any of the time slots defined by the time increments at x:00, x:10, x:20, x:30, x:40, and x:50. For example, in a given hour, the actual times at which the controller 34 polls and triggers the community-event(s) might be x:06, x:12, x:21, x:38, x:43, and x:52. This variability introduces additional excitement and randomness into the wagering game.

Figure 4:
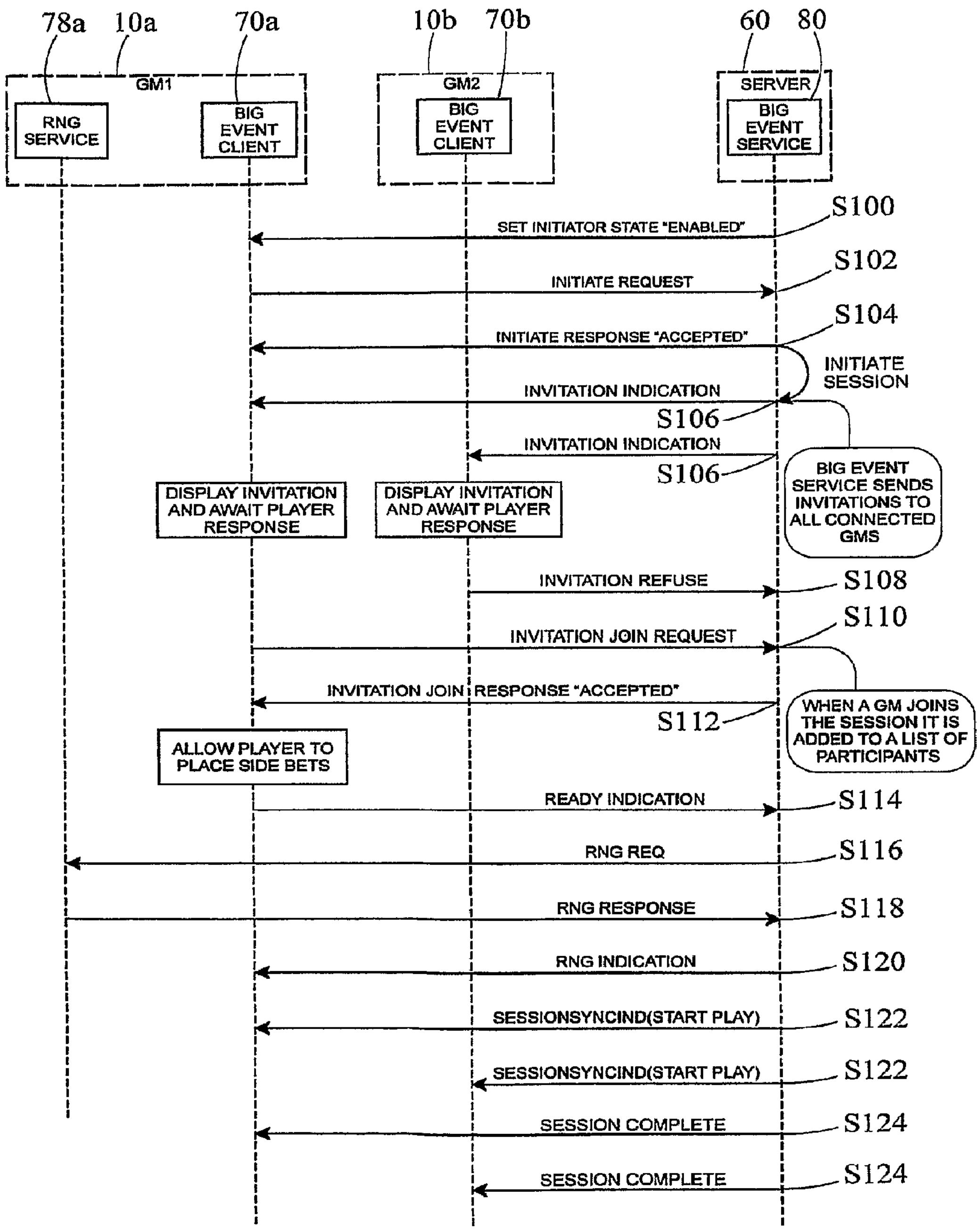
FIG. 4 is a diagrammatic of a community-event process, according to another embodiment of the present invention.

Referring to FIG. 4, a process of triggering and playing the Big Event Game is illustrated using the two gaming machines 10*a*, 10*b* (referred to as gaming machine one ("GM1") and gaming machine two ("GM2"), respectively) and the server 60 of FIG. 3. GM 1 includes the RNG Service 78*a* and the Big Event Client 70*a*. GM 2 includes its own Big Event Client 70*b*. Optionally, GM 2 can also include an RNG Service.

At step S100, GM 1 is enabled as the initiator. For example, the Big Event Coordinator 80 sends a message signal to the Big Event Client 70*a* of GM 1 to set the initiator to an "Enabled" state, e.g., the message signal can instruct GM 1 to "SET INITIATOR STATE 'ENABLED'." Then, at step S102, the enabled GM 1 sends a "INITIATE REQUEST" message signal to the Big Event Coordinator 80, which is a request for initiating a session of the Big Event Game. The Big Event Coordinator 80 accepts the "INITIATE REQUEST" message signal, at step S104, replying with an "INITIATE RESPONSE 'ACCEPTED'" message signal. The session of the Big Event Game is then initiated by the Big Event Coordinator 80.

Alternatively, more than one gaming machine can be enabled as an initiator. For example, if both GM 1 and GM 2 are enabled as initiators, then prioritization conditions may occur when both GM 1 and GM 2 attempt to initiate a session concurrently. If a session of the Big Event Game is already in progress, the Big Event Coordinator 80 may deny any subsequent requests. For example, if GM 2 requests the initiation of a session after a session has been initiated at the request of GM 1, the GM 2 request will be denied. The request will be denied indefinitely or until a predetermined condition occurs, e.g., until the session ends. In alternative embodiments, multiple concurrent or overlapping requests may be allowed.

When the session of the Big Event Game is initiated, the Big Event Coordinator 80 sends invitations to all of the connected gaming machines, i.e., GM 1 and GM 2. Thus, at step S106, each one of GM 1 and GM 2 receives an "INVITATION INDICATION" message signal from the Big Event Coordinator 80. Each one of GM 1 and GM 2 displays an invitation dialog and waits for a response from the corresponding player. Each player can choose to accept or reject the invitation.

Alternatively, the initiator is automatically included and the invitation is sent to other gaming machines. For example, in the above example an invitation is sent only to GM 2 because GM 1 is the initiator.

In this example, the player of GM 2 chooses not to participate in the Big Event Game. Consequently, at step S108, the player of GM 2 sends an "INVITATION REFUSE" message signal to the Big Event Coordinator 80. In contrast, the player of GM 1 chooses to participate in the Big Event Game. Consequently, at step S110, the player of GM 1 sends an "INVITATION JOIN REQUEST" message signal to the Big Event Coordinator 80. When GM 1 joins the Big Event Game, it is added to a list of participating gaming machines.

Alternatively, a global time limit may be used to limit the time for receiving a late acceptance. If, for example, the player of GM 2 sends an "INVITATION JOIN REQUEST" message signal after the global time limit has expired, then the Big Event Coordinator 80 returns a message signal indicating that the request is denied. As an example, a timer can be displayed on at least one of a primary display 14 or a secondary display 16 corresponding to one or more of GM 1, GM 2, and overhead sign 62 to let the player know how much time there is left.

At step S112, the Big Event Coordinator 80 accepts the "INVITATION JOIN REQUEST" from GM 1 and returns an "INVITATION JOIN RESPONSE 'ACCEPTED'" message signal to indicate acceptance of GM 1 as a participating gaming machine. In some embodiments the players of GM 1 and GM 2 may place one or more side wagers for the Big Event Game. Then, at step S114, the player of GM 1 sends a "READY INDICATION" message signal, to indicate that he or she is ready to continue playing the Big Event Game. Optionally, if the player of GM 1 does not place a side wager within a predetermined time limit, GM 1 closes the opportunity for placing side wagers and sends the "READY INDICATION" message signal without having received a side wager.

In the above example, participation of GM 1 is determined using a buy-in model, wherein participation is voluntary and it is decided by the player. Alternatively, in an eligibility model, a gaming machine participates in the Big Event Game after an eligibility determination has been made. Participation in the eligibility model is automatic and it is decided by the gaming machine, rather than the player. Each one of the connected gaming machines makes a determination whether the player is eligible for joining the Big Event Game. If the player is eligible, then the corresponding gaming machine sends an "INVITATION JOIN REQUEST" message signal to the Big Event Coordinator 80. If the player is not eligible, then the corresponding gaming machine sends an "INVITATION REFUSE" message signal to the Big Event Coordinator 80.

At this point, in the process of FIG. 4, all of the participating gaming machines, i.e., GM 1, are ready to continue playing the Big Event Game. The Big Event Coordinator 80 requests a random number (or numbers) from the RNG Service 78*a* of GM 1. The random number, which dictates one or more of the randomly selected outcomes of the Big Event Game, is requested at step S116 using a "RNG REQ" message signal. At step S118, GM 1 sends a message signal providing the requested random number, e.g., sending a "RNG RESPONSE" message signal.

If there is more than one participating gaming machine in the Big Event Game, random number generation can be provided by any of the participating gaming machines. For example, a first gaming machine 10*a* can provide random number generation related to the triggering of the Big Event Game (e.g., the Big Event Game is triggered if a randomly generated number is within a predetermined range) and a second gaming machine 10*b* can provide random number generation related to the randomly selected outcomes within the Big Event Game. Optionally, the Big Event Game can be triggered by the Big Event Coordinator 80.

In another example, a first gaming machine 10*a* can provide random number generation for a first outcome of the Big Event Game and a second gaming machine 10*b* can provide random number generation for a second outcome of the Big Event Game. Thus, the random number generation associated with the Big Event Game can be provided by any and more than one of the participating gaming machines 10*a*, 10*b*. The numbers selected during the random number generation are aggregated to encompass a plurality of outcomes for the session (e.g., the first outcome and the second outcome of the Big Event Game). The aggregation of outcomes is transmitted to the participating gaming machines. For example, if the Big Event Game is a community Monopoly® board game (FIG. 5), the first outcome can be a first roll of the dice and the second outcome can be a subsequent roll of the dice. The first roll of the dice and the second roll of the dice are aggregated and transmitted to the participating gaming machines.

Optionally, one or more of the randomly selected outcomes within the Big Event Game can have a number of sub-outcomes. For example, while playing the community Monopoly® board game, the player receives an award if an outcome of the game allows a player's game piece to move past the starting point of the game twice. To receive the award, the player will generally require a plurality of dice rolls, i.e., a plurality of sub-outcomes, to move across the board. Each dice roll requires a randomly generated number, which can be provided from any of the gaming machines 10*a*, 10*b*.

After the random number has been received from the RNG Service 78*a*, the Big Event Coordinator 80 sends at step S120 an "RNG INDICATION" message signal to all the participating gaming machines (which in the above example is only GM 1) to share the outcome determined by the RNG Service 78*a* of GM 1. Then, at step S122 the Big Event Coordinator 80 sends a "SESSIONSYNCIND (START PLAY)" message signal to all the connected gaming machines to coordinate, for example, the display and/or enactment of the shared outcome on each of the connected gaming machines 10*a*, 10*b*. The shared outcome of the game (e.g., moving a game piece across the Monopoly® game-board as a function of the randomly selected outcome indicated by the dice) is displayed on one or more of a corresponding primary display 14 and secondary display 16 of the gaming machines 10*a*, 10*b*. In addition, the shared outcome is optionally displayed on the overhead sign 62.

If the gaming machine 10*a*, 10*b* is a participating machine 10*a* in the Big Event Game, then it will commit the player's side wagers, if appropriate. If the gaming machine 10*a*, 10*b* is not participating in the Big Event Game, then it may use the message signal, for example, to inhibit timed expiration of the player's current eligibility while the game is in progress.

When the Big Event Game is finished, at step S124, the Big Event Coordinator 80 sends a "SESSION COMPLETE" message signal to each of the participating gaming machines. The participating gaming machines will, then, display game-related information, such as the player's winnings, and return to the basic game 72.

Figure 5:
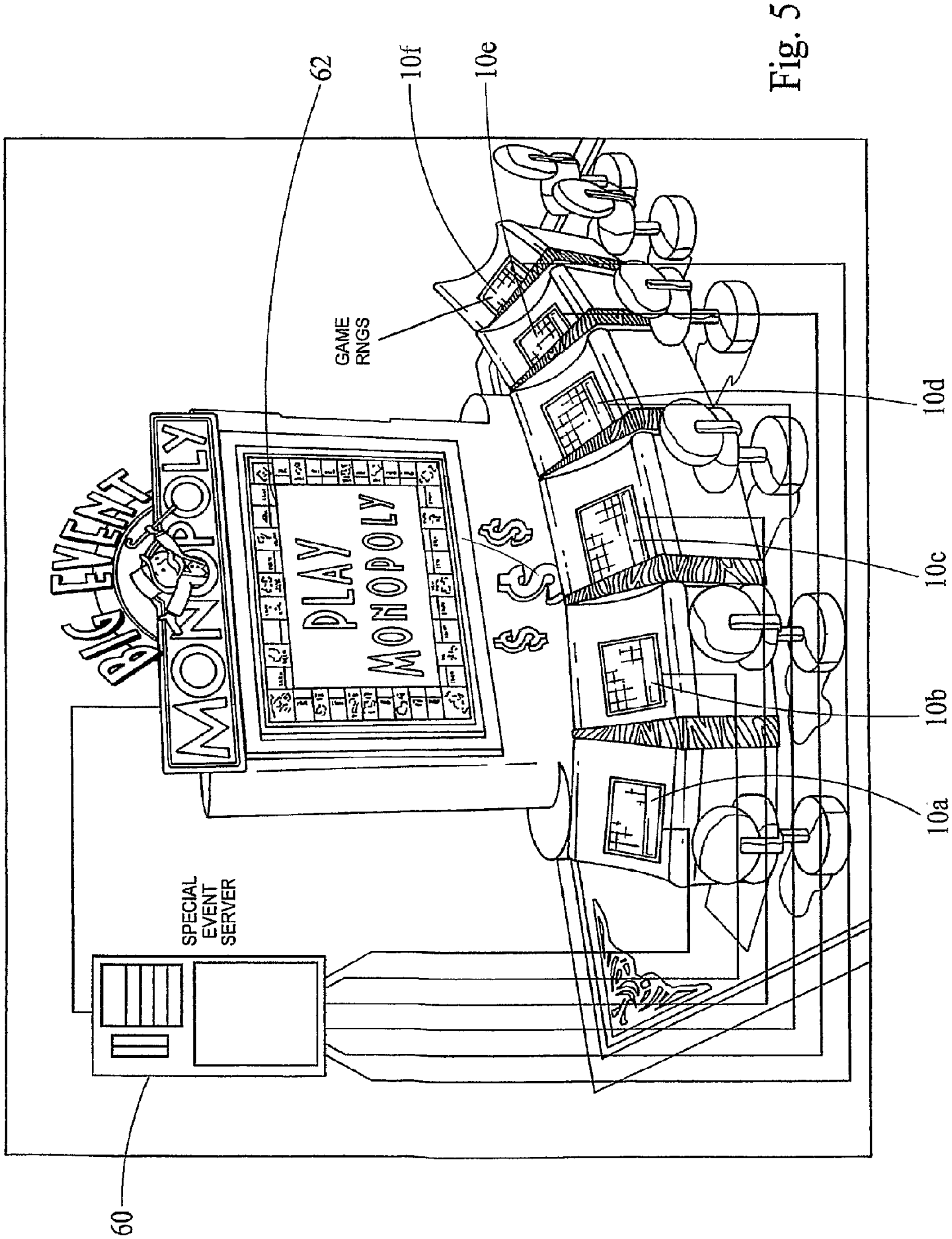
FIG. 5 is a perspective illustration of a gaming system for conducting a community-event, according to yet another embodiment of the present invention.

Referring to FIG. 5, a gaming system for conducting a Big Event community bonus game includes a plurality of gaming machines 10*a*-10*f*, a server 60, and a signage 62. The gaming machines 10*a*-10*f* and the signage 62 are connected to the server 60, which is used for distributing information to and from one or more of the gaming machines 10*a*-10*f*.

The gaming machines 10*a*-10*f* are arranged in a semicircular arrangement around the signage 62, and each player of any of the gaming machines 10*a*-10*f* is able to observe the signage 62 for playing the bonus game. The bonus game can be played similarly to the method described above in reference to FIGS. 3 and 4.

Each gaming machine 10 includes a controller 34 (FIG. 2), which includes an RNG Service 78 for coordinating a basic game that is typically played locally and individually at the gaming machine 10. However, one or more of gaming machines 10*a*-10*f* has its controller 34 and associated RNG Service 78 used for determining the outcomes of the basic game and for determining a randomly selected outcome in the community-event that is shared by several of the gaming machines 10*a*-10*f*. As such, at least one controller 34 has an RNG Service 78 for controlling the community-event outcome of a neighboring gaming machine 10.

In an alternative embodiment, the server 60 is replaced by any one of the gaming machines 10*a*-10*f*. For example, a first gaming machine 10*a* performs the functions of the server 60, e.g., game coordination, and becomes a master gaming machine 10*a*. Thus, the master gaming machine 10*a* performs the functions associated with any one of a game coordinator, a game initiator, and/or a random number source, i.e., the master gaming machine 10*a* is both a community-event server and a gaming machine.

In another alternative embodiment, a server 60 is coupled to a memory 36 and includes data for determining a randomly selected bonus-game outcome based on a randomly selected number. A gaming machine 10 includes an RNG Service 78 for selecting the randomly selected number. After the server 60 receives the randomly selected number from the RNG Service 78, the server 60 determines the randomly selected bonus-game outcome that corresponds to the randomly selected number. For example, the server 60 includes a look-up table that associates a plurality of randomly selected bonus-game outcomes corresponding to a plurality of randomly selected numbers. When a randomly selected number is sent by the RNG Service 78, the server 60 matches the selected number to the corresponding outcome. Alternatively, the RNG Service 78 determines both the randomly selected number and its associated randomly selected bonus-game outcome. In this embodiment, as opposed to only the randomly selected number being transmitted to the server 60, only the bonus-game outcome is transmitted to the server 60.

The functions of triggering a session of the community-event, sharing information related to the community-event, and determining outcomes of the community-event can vary dynamically and/or randomly over time among the plurality of gaming machines 10*a*-10*f* and, optionally, the server 60. For example, the initiator machine that triggers a session of the community-event can vary from one session of the community-event to another session of the community-event. As such, assuming that in a first session of the community-event the initiator machine is the first gaming machine 10*a*, in a second session of the community-event the initiator machine can be the first gaming machine 10*a*, the second gaming machine 10*b*, or the server 60. The type of triggering can be an outcome achieved during the wagering game, or it can be a random event unrelated to the wagering games being played at the gaming machines 10*a*-10*f* (e.g., selection of a random number within a predetermined range).

Information related to the community-event (e.g., triggering of the game, sub-outcomes within the event, outcomes of the event, etc.) can be shared directly among the plurality of gaming machines 10*a*-10*f*, or can be shared indirectly via one of the gaming machines 10*a*-10*f* or the server 60. For example, in a first session of the community-event the information is shared directly from the first gaming machine 10*a* to the second gaming machine 10*b*. In a second session of the community-event, the information is shared indirectly from the first gaming machine 10*a* to the second gaming machine 10*b* via the third gaming machine 10*c*. Optionally, the information can be shared via the server 60.

Determination of outcomes of the community-event can vary from one session of the community-event to another session of the community-event among the plurality of gaming machines 10*a*-10*f*. For example, a first outcome of the community-event is determined by the first gaming machine 10*a* in a first session of the community-event, a second outcome of the community-event is determined by the second gaming machine 10*b* in a second session of the community-event, and so on.

While the figures describe the same type of gaming machines within the system, in an alternative embodiment of the present invention, at least two of the gaming machines 10*a*-10*f* play a different type of wagering game, although they participate in the same community-event. For example, each player of a first gaming machine 10*a* and a second gaming machine 10*b* play, individually, a different local slots game, but play the Big Event Game when triggered.

Figure 6:
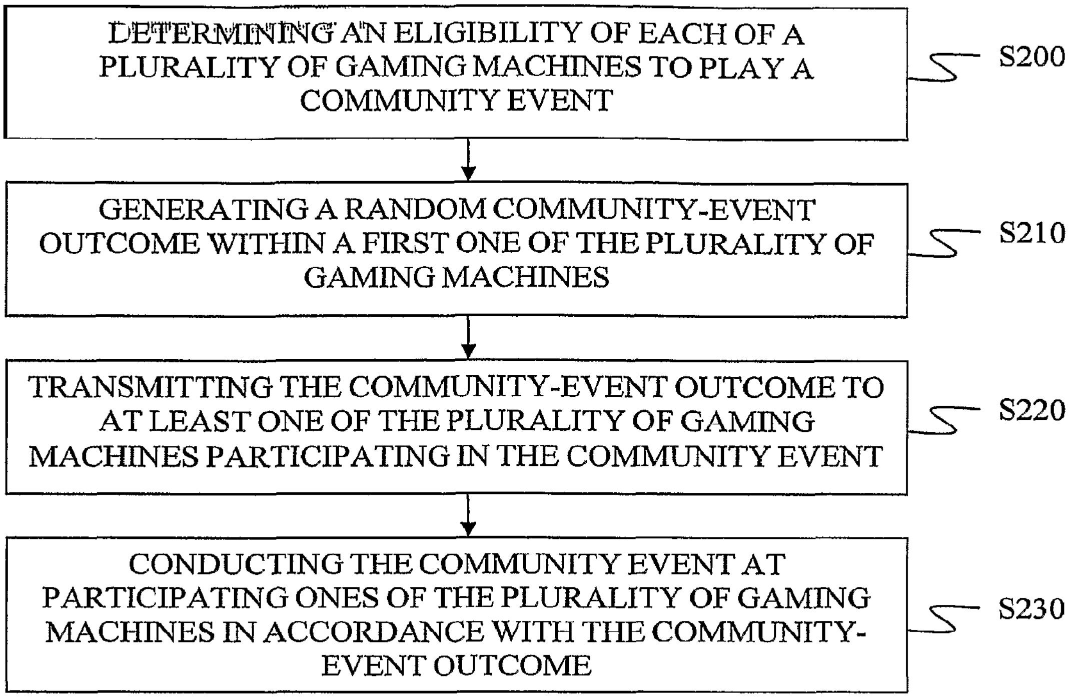
FIG. 6 is a flowchart of a method of conducting a community-event according to at least some embodiments of the present invention.

FIG. 6 is a flowchart of a method of conducting a community-event according to at least some embodiments of the present invention. In FIG. 6, a method of conducting a community-event game for a plurality of gaming machines 10*a-n* configured to conduct a wagering game and to participate in a community-event game includes a step S200 of determining an eligibility of each of the plurality of gaming machines to play a community-event. In accord with the disclosure above, the step S200 of determining an eligibility of each of the plurality of gaming machines may include any combination of the aforementioned eligibility criteria including, but not limited to, the placing of a maximum bet, the attainment of a minimum average of coin-in over a specified period of time, the attainment of an aggregate total of coin-in, the placing of a certain configuration of bet (e.g., covering all pay lines), the occurrence of a particular result or symbol in a basic wagering game or bonus game, or the occurrence of one or more particular winning combinations.

The method in accord with FIG. 6 also includes the steps S210 of generating a random community-event outcome within one of the plurality of gaming machines (e.g., 10*a*) and transmitting the community-event outcome to at least one of the plurality of gaming machines participating in the community-event, such as is shown by way of example in FIGS. 3-5. Alternatively, the generating of a random community-event outcome may occur externally to the plurality of gaming machines (e.g., a controller or server associated with external systems 50) and transmitted from the external source to at least one of the gaming machines participating in the community-event. The method also includes, in step 220, conducting the community-event at participating ones of the plurality of gaming machines 10*a-n* in accordance with the community-event outcome.

Figure 7:
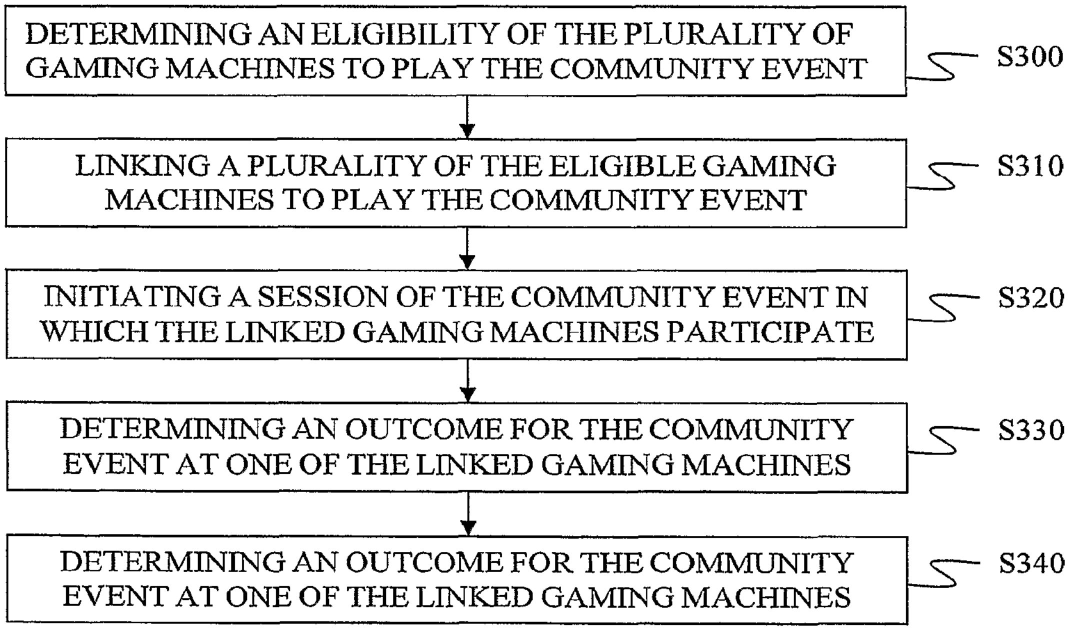
FIG. 7 is a flowchart of a method of conducting a community-event according to at least other embodiments of the present invention.

FIG. 7 is a flowchart of a method of conducting a community-event according to at least other embodiments of the present invention. This method includes the steps of determining an eligibility of the plurality of gaming machines 10*a-n* to play the community-event (step S300) and linking a plurality of the eligible gaming machines to play the community-event (step S310). The linking of the eligible gaming machines 10*a-n* may be performed subsequent to step S300, or may be performed prior to step S300 (e.g., by linking all of the gaming machines 10*a-n* and then dropping those gaming machines not satisfying an eligibility criterion or eligibility criteria). The linking of the eligible gaming machines may utilize any conventional communication medium (e.g., IR, carrier waves, etc.) and/or communication encryption techniques, but is generally preferred to occur through secure hardwired communication pathways.

The method of FIG. 7 also includes the steps of initiating a session of the community-event in which the linked gaming machines participate (step S320), determining an outcome for the community-event at one of the linked gaming machines (step S330), and sharing the outcome with at least one of the linked gaming machines (step S340).

In accord with other aspects of the present concepts, the eligibility requirements and models for the community-event game disclosed herein may be independently implemented in a gaming system wherein the community-event is triggered by and/or conducted by a server external to the gaming machines. Thus, each of the criteria noted above with respect to determinations of eligibility of a gaming machine may similarly be used as independent triggers for the initiation of a community-event.

In additional aspects of the present concepts, a controller (e.g., 34) may poll a plurality of gaming machines 10*a-n* or receive information therefrom corresponding to the aforementioned criteria (e.g., the placing of a maximum bet, the attainment of a minimum average of coin-in over a specified period of time, the attainment of an aggregate total of coin-in, the placing of a certain configuration of bet, the occurrence of a particular result or symbol in a basic wagering game or bonus game, the occurrence of one or more particular winning combinations, etc.). Accordingly, a triggering event for the community-event may comprise events other than a randomly generated number and may comprise, instead, an event or events caused, selected, or otherwise set into play by one or more of the players at the plurality of gaming machines 10*a-n*. Thus, each of the embodiments and aspects of the disclosed methods and systems may trigger the community-event in response to any combination of the conditions noted above with respect to the eligibility criterion and eligibility criteria.

The present concepts accordingly include, for example, a method of triggering a community-event game for a plurality of gaming machines configured to conduct a wagering game and to participate in a community-event game, as described herein. This method of trigger includes triggering a community-event in response to an input by a player of one of the plurality of gaming machines. This input could comprise, for example, a last bet placed by the player, an aggregate amount of coin-in by the player, a minimum rate of coin-in by a player, an aggregate rate of coin-in by a player, and/or a particular configuration of bet (e.g., a bet covering all pay lines or a maximum bet for one pay line or a plurality of pay lines), just prior to a point in time at which the gaming machine is polled by a controller (e.g., 34, 50) and/or an output signal corresponding to such input is transmitted from the gaming machine to the controller. The polling may be continuous or periodic and may be performed sequentially, randomly, or in accord with an instruction set executable by the controller (34, 50).

The trigger input may optionally be time-limited so that the triggering input comprises a triggering event only during a predetermined time period, which time period may be opened randomly, in accord with a schedule, or in response to another triggering event. The players may be, or may not be, informed of the tolling of the predetermined time period and/or any timing remaining in the predetermined time period.

The present concepts also include, for example, a method of triggering a community-event game for a plurality of gaming machines configured to conduct a wagering game and to participate in a community-event game, as described herein, including triggering a community-event in response to a random outcome. The random outcome could comprise a single predetermined condition, comprising or consisting of a particular symbol or combination of symbols occurring during the basic wagering game or during an associated bonus game. This random outcome could include, for example, a winning combination of symbols on two reels, three reels, or four reels or a specific winning combination of symbols on two reels, three reels, or four reels. This random outcome could also include the occurrence of a particular symbol during play of a basic wagering game or bonus game.

Triggering of the community-event may also be constrained to occur only upon the satisfaction of a plurality of conditions or gates. In one aspect, the conditions may be satisfied independently in any order or, in another aspect, may be required to be satisfied sequentially in a predetermined order. The plurality of conditions could include any combination and/or sequence of the aforementioned player inputs and/or random outcomes. In this triggering scheme, the community-event is triggered only after the plurality of conditions have been satisfied.

In other embodiments, the community-event game trigger could be time specific. In this time-specific triggering model, a controller (e.g., 34, 50) triggers the community-event game in accord with one or more schedules. For example, a community-event game would be triggered at x:00, x:10, x:20, x:30, x:40, and x:50, where the hour is represented by x. In another example, the community-event game would be triggered at x:00 and x:30. Prior to the scheduled triggering events, the controller 34, 50 would poll all of the linked gaming machines 10*a-n*, or receive information transmitted from each of the linked gaming machines, associated with an eligibility of each of the gaming machines to participate in the community-event game, at which time the community-event game would be initiated and conducted with respect to such eligible gaming machines.

Each of these embodiments and obvious variations thereof is contemplated as falling within the spirit and scope of the claimed invention, which is set forth in the following claims.

What is claimed is:

1. A computer-implemented method of conducting a wagering game on a gaming system including an input device, and at least one display device, operably connected to one or more processors, the method comprising:

receiving an indication of a wager;

displaying outcomes of wagering games on the at least one display device in response to a wager indication being received, the displayed outcomes being randomly generated by at least one of the one or more processors;

accumulating a bonus-event playing time upon satisfying at least one predetermined condition as the wagering games are played;

initiating a bonus game in which a player is eligible to receive awards for a period of time;

determining, via at least one of the one or more processors, the accumulated playing time accrued prior to the initiation of the bonus game;

allowing the player to participate in the bonus game for at least as long as the accumulated playing time; and providing any awards earned by the player during their participation in the bonus game.

2. The method of claim 1, wherein additional playing time may be accrued during play of the bonus game, this additional playing time being used to lengthen the duration of the player's participation in the current bonus game.

3. The method of claim 1, wherein eligibility to participate in the bonus game is contingent upon the player accruing at least a minimum amount of playing time prior to the initiation of the bonus game.

4. The method of claim 3, wherein the player is provided the option to initiate the bonus game at any time after accruing the minimum amount of playing time.

5. The method of claim 1, wherein the randomly generated outcomes can award credits, playing time for a subsequent bonus game, or both upon satisfying at least another predetermined condition.

6. The method of claim 1, further comprising, triggering, during play of the wagering games, the bonus game to be initiated.

7. The method of claim 1, wherein the wagering game is a spinning-reels slot game and the at least one predetermined condition is a particular winning combination being displayed.

8. The method of claim 1, wherein the wagering game is a spinning-reels slot game and the at least one predetermined condition is a particular symbol being displayed.

9. The method of claim 1, wherein the wagering game is a spinning-reels slot game and the at least one predetermined condition is independent of the spinning-reels outcome.

10. A gaming system for conducting a wagering game including a bonus game, the gaming system comprising:

at least one input device;

at least one display device;

at least one processor; and at least one memory device that stores a plurality of instructions that, when executed by the at least one processor, cause the at least one processor to operate with the at least one display device and the at least one input device to receive an indication of a wager, display a randomly generated outcome of the wagering game in response to the wager indication being received, accumulate bonus-event playing time upon satisfying at least one predetermined condition as the wagering games are played, initiate a bonus game in which a player is eligible to receive awards for a period of time, determine the accumulated playing time accrued prior to the initiation of the bonus game, provide the bonus game for at least as long as the accumulated playing time; and credit any awards earned by the player during their participation in the bonus game.

11. The gaming system of claim 10, wherein the wagering game is a spinning-reels slot game and the at least one predetermined condition is a particular winning combination being displayed.

12. The gaming system of claim 10, wherein the wagering game is a spinning-reels slot game and the at least one predetermined condition is a particular symbol being displayed.

13. The gaming system of claim 10, wherein the wagering game is a spinning-reels slot game and the at least one predetermined condition is independent of the spinning-reels outcome.

14. The gaming system of claim 10, the plurality of instructions further causing the at least one processor to operate with the at least one display device and the at least one input device to award additional playing time during play of the bonus game, this additional playing time being used to lengthen the duration of the player's participation in the current bonus game.

15. The gaming system of claim 10, wherein eligibility to participate in the bonus game is contingent upon the player accruing at least a minimum amount of playing time prior to the initiation of the bonus game.

16. The gaming system of claim 10, wherein the randomly generated outcome of the wagering game can award credits, playing time for a subsequent bonus game, or both in response to a particular outcome being displayed.

17. A computer program product comprising a non-transient computer-readable medium having an instruction set borne thereby, the instruction set being configured to cause, upon execution by one or more controllers, the acts of:

receiving an indication of a wager;

determining outcomes for wagering games in response to a wager indication being received, the outcomes being randomly determined from a plurality of outcomes;

accumulating a bonus-event playing time upon satisfying at least one predetermined condition as the wagering games are played;

initiating a bonus game in which a player is eligible to receive awards for a period of time;

determining the accumulated playing time accrued prior to the initiation of the bonus game; and executing the bonus game for at least as long of a duration as the accumulated playing time.

18. The computer program product of claim 17, wherein additional playing time may be accrued during the execution of the bonus game, this additional playing time being used to lengthen the duration of the current bonus game.

19. The computer program product of claim 17, wherein eligibility to participate in the bonus game is contingent upon the accumulation of at least a minimum amount of playing time prior to the initiation of the bonus game.

20. The computer program product of claim 17, wherein the randomly generated outcomes can award credits, playing time for a subsequent bonus game, or both.

* * * * *